April 11, 1950 N. F. ARMSTRONG ET AL 2,503,989
LABELING MACHINE WITH SUCTION LABEL FEED MEANS
Filed March 4, 1949 8 Sheets-Sheet 1

Inventors
Norman F. Armstrong
John A. Tweddell
By
Alexander H. Odell
Attorneys

April 11, 1950  N. F. ARMSTRONG ET AL  2,503,989
LABELING MACHINE WITH SUCTION LABEL FEED MEANS
Filed March 4, 1949  8 Sheets-Sheet 2

Inventors
Norman F. Armstrong
John G. Twiddell
By
Alexander Dowell
Attorneys

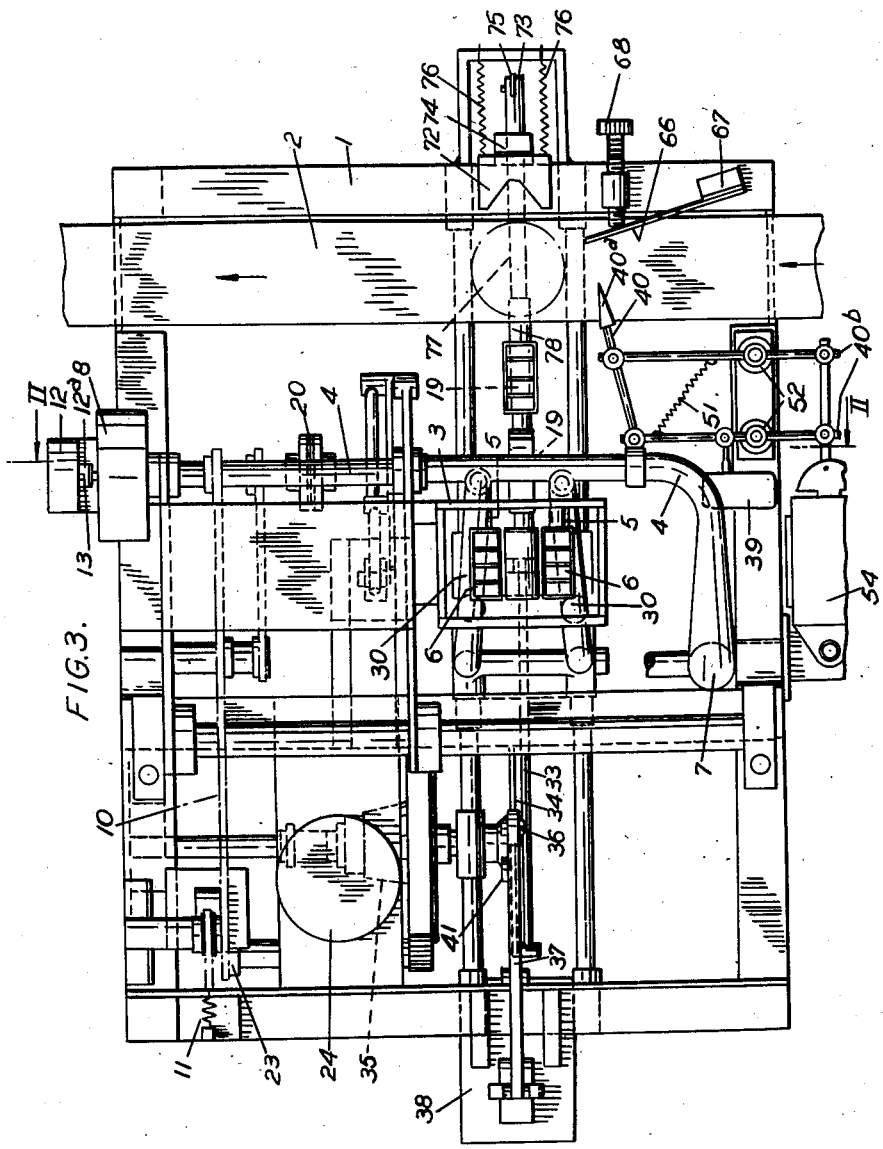

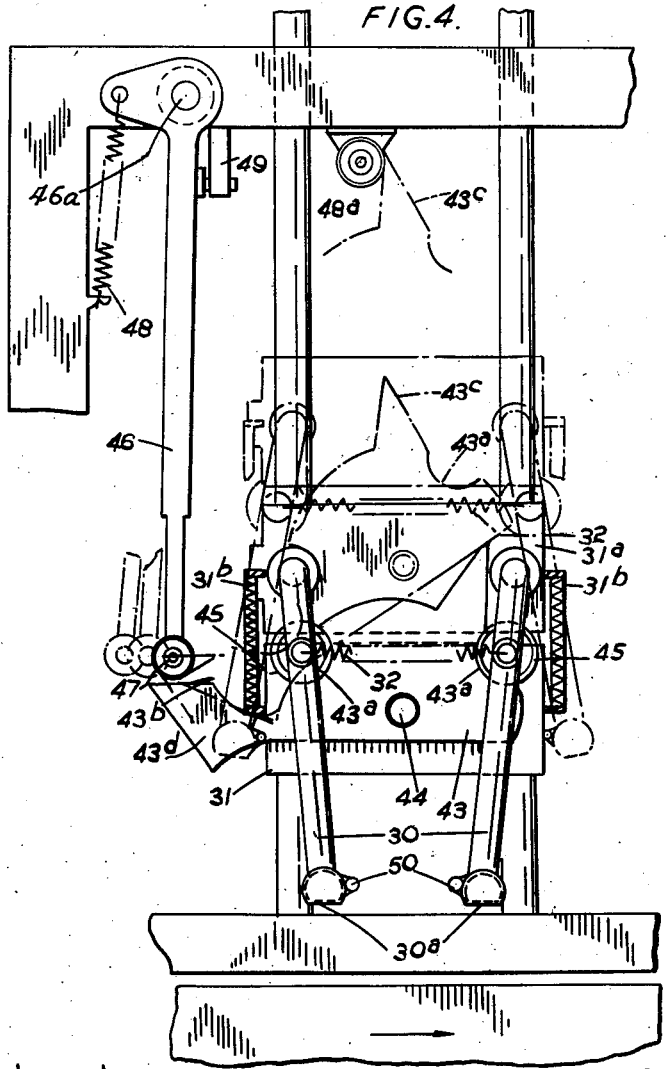
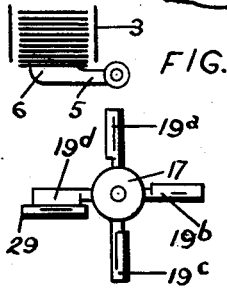
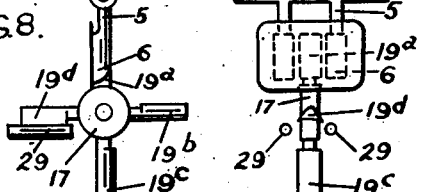
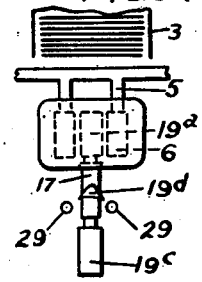

April 11, 1950   N. F. ARMSTRONG ET AL   2,503,989
LABELING MACHINE WITH SUCTION LABEL FEED MEANS
Filed March 4, 1949                       8 Sheets-Sheet 5
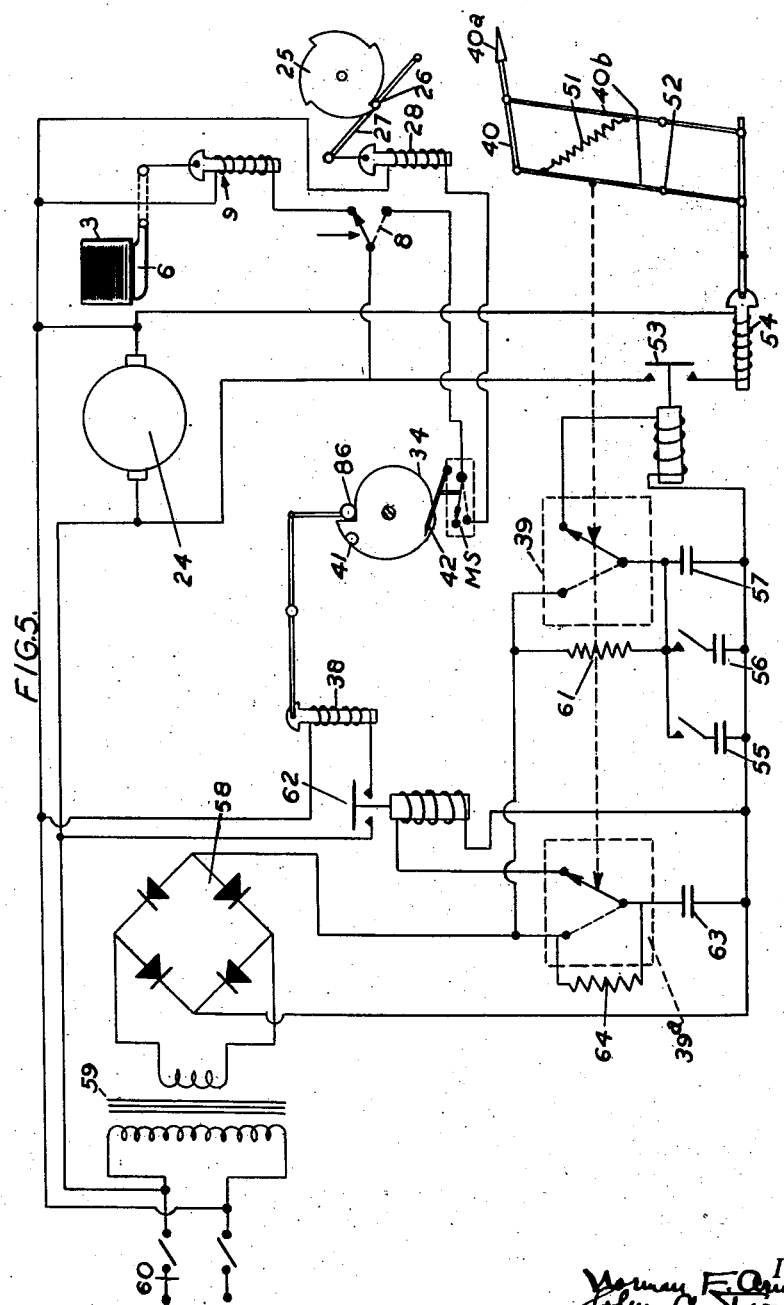

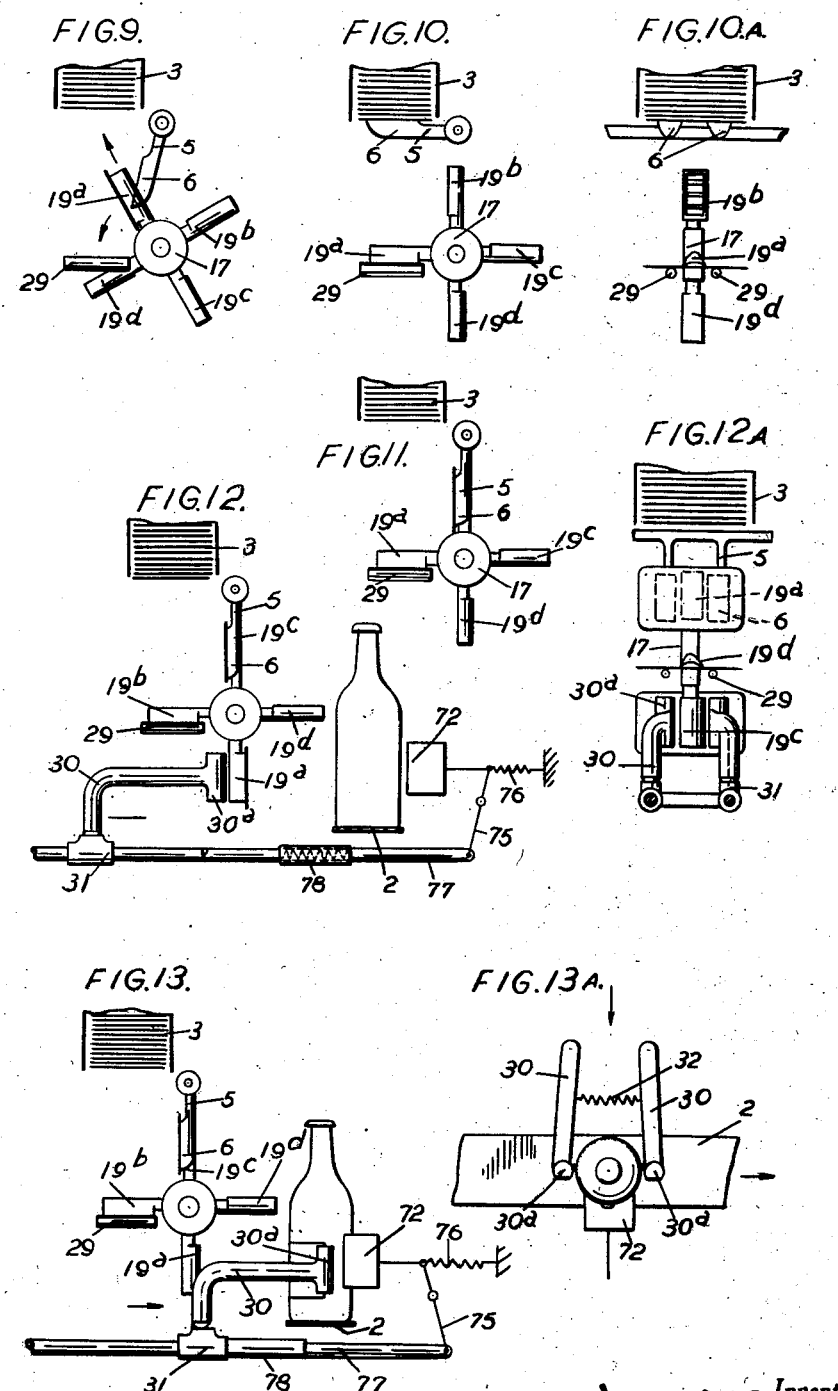

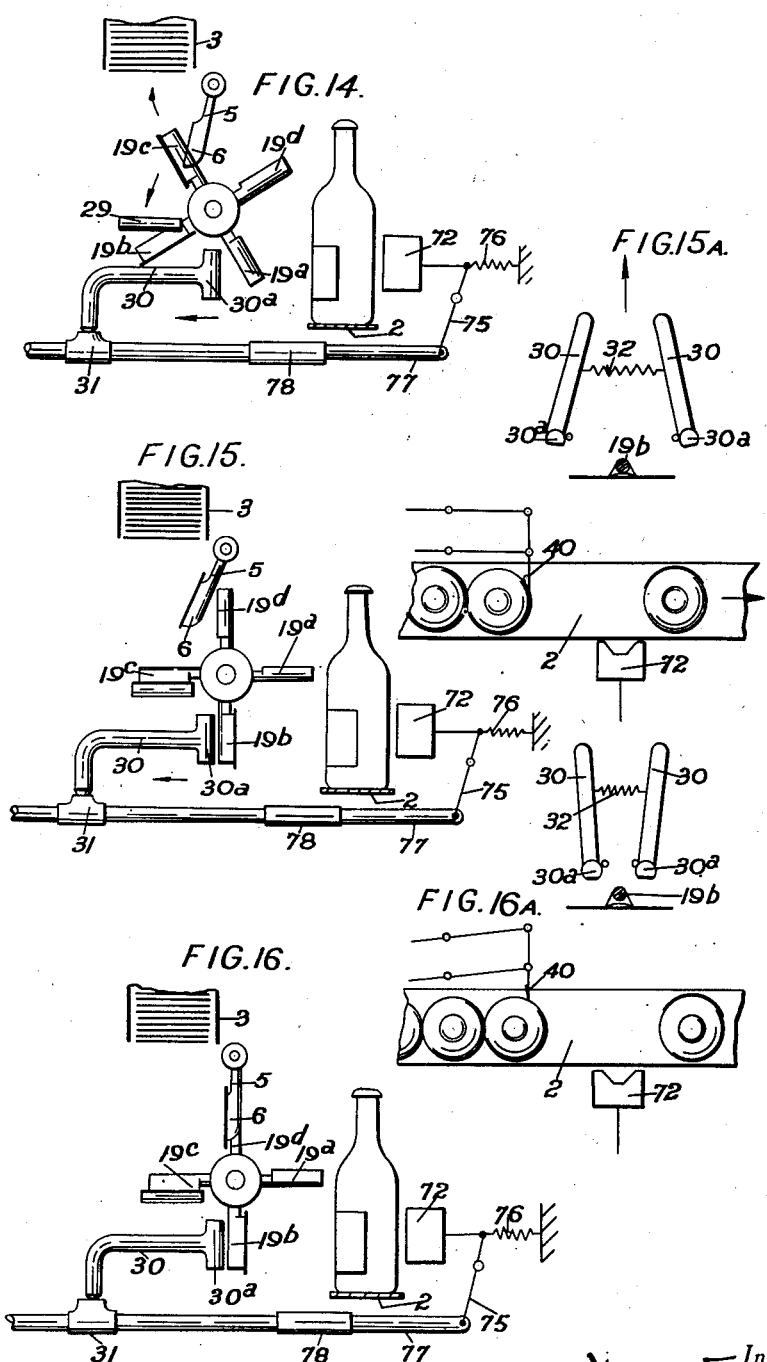

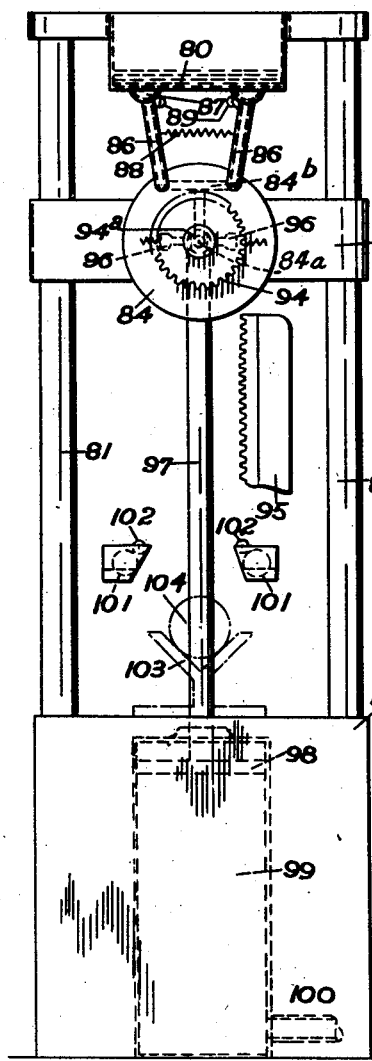
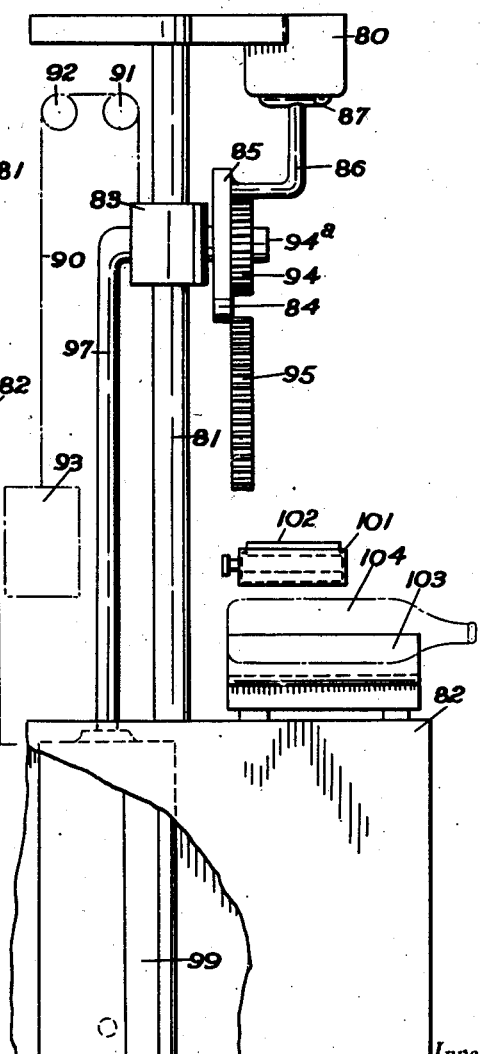
FIG.17.
FIG.18.

Patented Apr. 11, 1950

2,503,989

UNITED STATES PATENT OFFICE 2,503,989

LABELING MACHINE WITH SUCTION LABEL FEED MEANS

Norman F. Armstrong and John A. Tweddell, Newcastle-on-Tyne, England, assignors to The Crown Cork Company Limited, Southall, England, a British company Application March 4, 1949, Serial No. 79,608

23 Claims. (Cl. 216—55)

This invention consists in an improved labelling machine for labelling articles such as bottles, tins, jars and packets.

The invention has for its object the provision of a labelling machine for labelling articles of varying sizes without the necessity of adjustment to accommodate a particular size, in which as long as there is a supply of labels in the machine, the feed of the labels to the articles will take place automatically in accordance with the passage of the articles through the machine and will operate only when an article is presented for labelling. Another object is to provide means whereby the label feeding means will only feed when they have picked up a label, while the fed label will be held in the labelling position until the article has been fed to the position for transfer of the label thereto. A further object is to provide an automatic gumming device which will gum each label or an automatic wetting device which will wet each ready gummed label as it is fed to the labelling position. A still further object is to provide a machine which may be applied to an existing conveyor belt for conveying the articles.

According to the invention the means for feeding the labels comprise suction gripping means —hereinafter referred to as a "feed gripper"— which in addition to being connected to a suction source, are connected to a suction operated actuating device for controlling the movement of the said feed gripper, the actuating device being adapted to cause the operation of the said feed gripper so that when the vacuum is reduced or destroyed—owing to there being no label gripped by the feed gripper—the said feed gripper will move against the label stack to take up a label, and when the vacuum is restored or increased—when there is a label being gripped— the feed gripper will move the label away from the stack towards the labelling position.

Preferably the movement of the label from the stack to the labelling position is effected in three stages by arranging for the feed gripper, as soon as the label has been picked up thereby, to move into the path of suction transfer means which by suction take up the label from the feed gripper and hold it by suction and carry it into the path of a label affixing device which then applies the label to the article to be labelled— hereinafter referred to in the description and claims for convenience as a "bottle."

The said suction transfer means may function similarly to the feed gripper, in that they are also connected to a suction operated actuating device for controlling their movement, so that when they have taken a label off the feed gripper, the increased vacuum operates the said actuating device to arrest the transfer means when they arrive in line with the labelling position on the bottle, or they may comprise an intermittently rotated conveyor having a number of suction blocks which come behind and to the side of the feed gripper suction blocks and remove the label therefrom mechanically but retain it in position by suction, rotation of the conveyor being automatically arrested when the label arrives in line with the labelling position on the bottle.

According to a further feature of the invention, after the label has been brought to the level of the labelling position on the bottle, it is transferred to a label affixing device comprising a pair of hollow arms carrying suction blocks for gripping the label, and means for moving the arms towards the bottle with the arms on either side of the bottle axis so that the arms ultimately contact the sides of the bottle and spread the label thereon. Means are preferably provided for spreading the arms as they recede from the bottle so that they do not foul a following label.

According to a simplified form of the invention adapted for labelling relatively small numbers of articles per minute the conveying of the label from the stack to the labelling position is effected in one operation by mounting the feed gripper to rotate on the end of a carrier member adapted to move to and from the label stack, a tripping device being arranged along the path of movement of the feed gripper between its upper and lower positions so that as the gripper moves away from and towards the stack it is turned through 180° and is then always in the correct position for receiving a label or depositing one on the article.

In the above simplified form the turning of the feed gripper may be effected by means of a pinion rigidly secured thereto, and a rack arranged parallel with the direction of movement of the carrier member and adapted to be engaged by the pinion after the feed gripper has left the stack, and to be disengaged from the pinion before the feed gripper reaches the labelling position, and vice versa for the return movement, means such as flats being provided on the pinion hub for engagement with corresponding resilient blocks also provided with flats so that the gripper is held resiliently against turning in both positions.

The invention will now be described by way of example with reference to the accompanying drawings.

In the said drawings—

Fig. 3 is a plan of Fig. 1.

Fig. 4 is a detail plan view of the label spreader device.

Fig. 5 is a diagram of the electric circuit.

Figs. 7 to 16A are fragmentary diagrams showing the successive movements of the machine.

Figs. 17 and 18 are diagrammatic front and side elevations respectively of a simplified form of machine.

Figure 1:
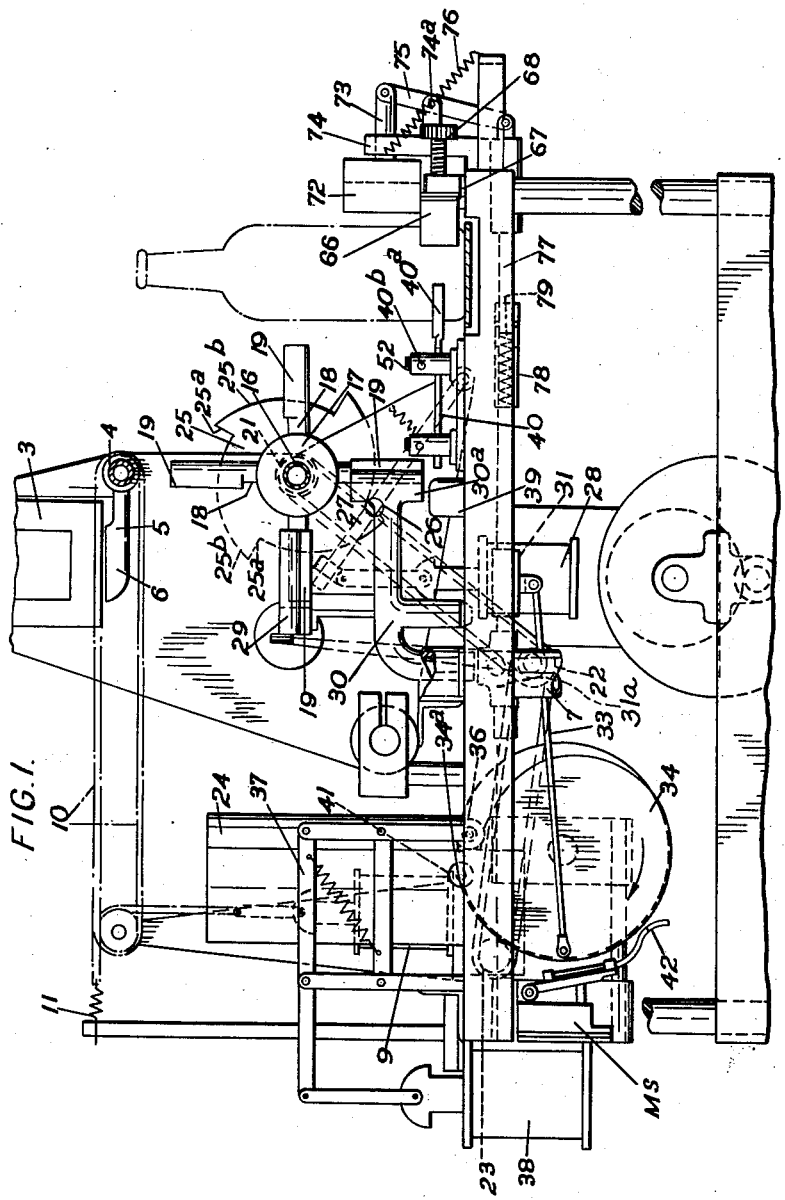
Fig. 1 is an elevation of a self-contained bottle labelling machine which may be brought into position adjacent to a bottle conveyor belt.
Figure 2:
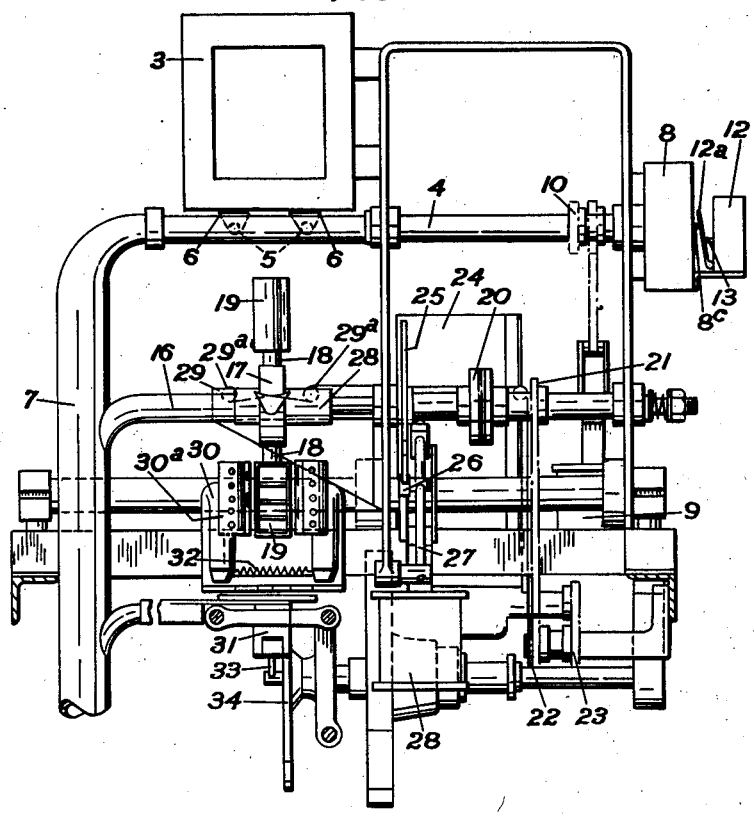
Fig. 2 is an end view of Fig. 1.
Figure 6:
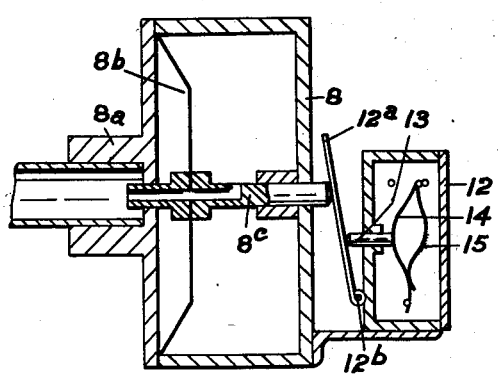
Fig. 6 is a detail sectional view of the diaphragm switch.

Referring more particularly to Figs. 1 to 6 of the drawings from one or other of which figures some parts are omitted for the sake of clarity, the machine comprises a frame 1 which is adapted to be placed beside a bottle conveyor belt 2, without the necessity of making any connection, so that the bottle may pass freely by the machine, means being provided for adjusting the height of the machine to suit that of the conveyor.

In the upper portion of the frame there is mounted a label stack holder 3 which is open at its lower end, the stack being supported by relatively narrow ledges so that the lowermost label may be drawn from the stack from beneath. Mounted adjacent the label stack holder is the feed gripper which comprises a horizontal transverse hollow shaft 4 on which is mounted to swing in vertical planes a pair of tubular arms 5 at the free end of each of which is mounted a suction block 6, the said blocks being adapted to be swung against the label stack pile to pick up a label. The shaft 4 is connected to a suction system (not shown) by the trunk pipe 7 which communicates with a pressure-difference actuating device which comprises a bell diaphragm operated mercury or, "micro"-switch, for controlling a solenoid 9 connected by means of a chain 10 to the shaft 4, the other end of the chain 10 being connected to the frame by a spring 11.

The diaphragm device may comprise a casing 8 which is connected to the suction system through a boss 8a (see Fig. 6), and is sealed at its open end by a resilient diaphragm 8b which is operatively connected to a push rod 8c projecting through the casing 8 and abutting at one end against a lever 12a pivotally mounted at 12b on a micro-switch casing 12, and itself abutting against a push rod 13 located between the rod 8c and the pivotal point 12b, which push rod 13 is adapted to operate the switch members 14, 15, which themselves control the circuit of the above solenoid means in such a way that when the vacuum is reduced or destroyed the said circuit is closed and the solenoid energized to bring the feed gripper suction blocks 6 against the label stack to grip a label, the gripping of a label having the effect of restoring the vacuum and so causing the diaphragm to move and operate the switching means to break the solenoid circuit, so that the feed gripper moves away from the stack into the path of a suction transfer device hereinafter described.

Vertically below the feed gripper is a suction transfer device which comprises a rotary transfer conveyor mounted to rotate about a second horizontal hollow stationary shaft 16 in substantially the same vertical plane as that of the shaft 4 of the feed gripper 5, and connected to the vacuum source 7. The hub 17 of the rotary transfer conveyor communicates with the hollow shaft 16 and has projecting radially at 90° four tubular arms 18 each of which has at its outer end a suction block 19 which is so arranged that it moves between the suction blocks 6 on the feed gripper and at the same level when the latter are in their lower position. The transfer conveyor is driven through a slipping clutch 20 by means of a sprocket 21 from other sprockets 22, 23 driven through reduction gear by an electric motor 24, and is caused to move intermittently by means of a transfer indexing disc 25 having four equally spaced indexing teeth 25a with slow cam inclines 25b between adjacent teeth, the said teeth being adapted to abut against a roller detent 26 mounted on a rocking arm 27 connected to a solenoid 28 which is controlled by a "micro-switch" hereinafter referred to.

At substantially the level of the axis of the transfer conveyor and in the path of the descending conveyor arms 18 there is a gum box 29 having therein twin rotating gumming rollers 29a between which the conveyor suction blocks 19 pass.

At the level of the lowest suction block 19 on the transfer conveyor there are the twin horizontal hollow arms 30 carrying suction blocks 30a of a label affixing device comprising a reciprocating carriage 31 arranged at right angles to the bottle conveyor 2, the said arms being pivotally mounted on the carriage 31 so as to be capable of moving away from each other against a spring 32. The carriage 31 is mechanically driven through a connecting rod 33 from an intermittently rotatable indexing disc 34—hereinafter referred to as the "labelling disc"—having a single index tooth 34a thereon and driven by the motor reduction gear through a slipping clutch 35. The indexing tooth abuts against a detent 36 adapted to be operated through a link parallelogram 37 by a solenoid 38 which is energised by the operation of one of a pair of "micro-switches" housed in a single casing 39 (Fig. 3) arranged at one side of the bottle conveyor 2. The switch 39 is adapted to be operated by a light weight arm 40 mounted on a parallel link mechanism and having a cam face 40a at its outer end which is adapted to contact with the sides of the bottle being presented for labelling, and so move the said arm laterally to operate the switch 39. Closing one of the switches 39 causes the solenoid 38 to withdraw the detent 36 so that the labelling disc 34 rotates and reciprocates the labelling device. The detailed operation of the switches 39 is described hereinafter with reference to Fig. 5. On its return movement, the labelling device by means of a detent roller 41 on the labelling disc 34, makes and breaks a "micro-switch" MS operated by a lever 42 which the roller 40 actuates, as a result of which the rotary conveyor solenoid 28 is energised so that the rotary conveyor is indexed once.

To effect the return of the labelling device suction blocks 30a past the conveyor suction block 19 so that they clear the label which the latter will be holding, there is arranged on the carriage 31 a segmental swivel plate 43 (see Fig. 4) mounted to swivel about a pin 44. On either side of, and offset from, the swivel pin 44 there are formed in the plate 43 two segmental recesses 43a which are adapted to receive two ball races 45 mounted respectively on the arm 30. On a transverse frame member there is pivotally mounted at 46a a pawl-like abutment consisting of a cranked lever 46 having a long and short arm. On the end of the long arm there is mounted a ball race 47, while the short arm is connected by a tension spring 48 to the frame, and holds the long arm pressed against a rubber covered abutment 49. The race 47 in the extreme outward position of the carriage 31 is adapted to abut against a lateral projection 43b on the plate 43 so that as the carriage 31 returns to its inner position the plate 43 swivels with the projection 43b held stationary by the race 47. This movement of the plate 43 causes the races 45 to be moved out of their recesses 43a until further swivelling of the plate 43 brings them on to the curved surface of the plate, as shown in dotted lines, so that the arms 30 are spread apart against the action of the spring 32, and the nozzles 30a are thus clear of the label supported by the transfer conveyor. The plate 43 is maintained in this position for the rest of the inward or return stroke of the carriage 31.

As the projection 43b passes the ball race 47 it forces it outwards as shown in dotted lines, and continues moving upwards with the carriage 31 until an inclined abutment 43c thereon abuts against a ball race 48 mounted about a stationary axis, as shown in dotted lines. This imparts an impact to the plate 43 sufficient to turn it back to its original position relatively to the carriage 31, in which position the races 45 once more engage their recesses 43a and hold the plate 43 positively against further swivelling. On the outward or labelling stroke of the carriage 31 an incline 43d on the plate 43, as it nears the end of the stroke forces the race 47 outwards as shown in chain lines, until the projection 43b is past the race which then, under the influence of the spring 48, once more occupies the position shown in firm lines.

As the arms 30 carrying a label spread about the bottle, rollers 50 on their inner portions assist the spreading of the label on the bottle.

In order to prevent damage to the labelling device in the event of a bottle jamming the portion of the carriage 31 to which the connecting rod 33 is coupled is made separate from the portion 31a carrying the twin arms 30 on which are mounted the suction blocks 30a and the two portions connected by springs 31b so that in the event of the blocks 30a being arrested by a jammed bottle or other obstacle, they are able to remain stationary while the other portion 31 of the carriage completes its movement against the tension of the spring 31b.

The machine may be belt fed, star wheel or hand fed.

Fig. 5 shows the electric circuit for the control of the labelling disc 34 by the passage of a bottle past the arm 40. The switch arm 40 is shown as one side of a parallel link mechanism having a diagonal spring 51 the parallel arms 40b of which are pivoted along their lengths at 52. One of the arms 40b is connected to the "micro-switch" 39 which is a two way switch and in the position shown, viz., with the arm 40 in the path of the bottles, closes the coil of a contactor 53 which controls a solenoid 54 whose plunger is connected to the ends of the long sides of the parallelogram remote from the arm 40. The coil of the contactor 53 is energised from a battery of condensers 55, 56, 57 which are adapted to be charged from a rectifier 58 connected to the secondary winding of a transformer 59 whose primary coil is connected across an A. C. source 60. The solenoid coil 54 is energised from the A. C. source 60. In the other position of the switch, viz., that shown in dotted lines the condensers 55, 56, 57, are connected across the rectifier and are charged. A polarity resistance 61 of relatively high ohmic value is in circuit with the condensers and the rectifier to maintain the polarity of the condensers constant.

The arm 40 is also operatively connected to another two way switch 39a and in the position shows in full line controls a contactor 62 whose coil is energised from a condenser 63, the contactor 62 controlling the solenoid 38 whose plunger is operatively connected to the roller detent 36 which effects the indexing of the labelling disc 34. The solenoid coil 38 is energised from the main supply 60. In the other position of the switch 39a, viz., that shown in dotted lines a condenser 63 is charged from the rectifier 58, a resistance 64 being in circuit with the condenser 63 to maintain the correct polarity.

The motor 24 drives the clutches and vacuum plant.

With the above switching arrangement when a bottle passes the arm 40 by means of the cam 40a it trips it against the action of the spring 51 and moves the arms of the switches 39, 39a into the dotted line positions so that the condensers 55, 56, 57 and 63 are charged, the plunger of the solenoid 54 offering no resistance as the condensers 55, 56, 57 have already discharged. When the arm 40 returns to its normal position under the influence of its spring the switches 39, 39a are moved into the firm lines position so that the condenser 63 and battery of condensers 55, 56, 57 discharge and energise their respective contactors 62, 53, so that the labeller disc is indexed and reciprocates the labelling carriage 31; and the solenoid 54 is energised, with the result that the trip arm 40 is held firmly in its normal position and so prevents the passage of the bottles while the labelling is proceeding. The battery of condensers, owing to their greater capacitance, take a longer time to discharge than does the single condenser 63 so that the arm 40 may be held for the necessary period of time during which the labelling takes place. Switches are provided for cutting in or out more or less of the condensers according to the time required.

An adjustable abutment for supporting the bottle against lateral movement owing to its reaction to the cam 40a is provided on the side of the conveyor 2 opposite that on which the arm 40 is located. As shown it may comprise a leaf spring 66 Fig. 3 anchored on a bracket 67, and adapted for adjustment by a set screw 68.

Holding of the bottle during the actual labelling is effected by means of a V-block 72 which is mounted on the end of a rod 73 slidable in a bracket 74 rigid with the machine frame, and pivotally connected to a lever 75 fulcrumed on a projection 74a on the bracket 74 springs 76 tending to maintain the block 72 in its retracted position. The lower end of the lever 75 pivotally connected to the one end of the one member 77 of a telescopic tube 77, 78 which houses a compression spring 79, the telescopic tube being slidably mounted in the machine frame in the path of the labelling carriage 31 so that as the latter approaches the labelling position it abuts against the member 78 of the telescopic tube and pushes it outwards, so that the lever 75 is rocked and the block 72 is pressed under resilient pressure against the bottle, and so counteracts the pressure of the labelling operation on the bottle. As soon as the labelling device is retracted, its carriage 31 moves out of contact with the telescopic tube 76, 77, and the springs 76 retract the block 72 to the position shown in the drawings.

The operation of the machine is as follows, reference being made also to the diagrammatic Figs. 7 to 16A with a view to simplifying the explanation. Before a bottle is presented for labelling, switching on the operating current will set the motor 24 in motion, and as the labelling disc solenoid 38 and the rotary conveyor solenoid will be de-energised, the said discs will, if they are not in such positions, take up their initial or indexed positions. The labelling carriage 31 is now at the beginning of its outward movement. At the same time the feed gripper 5 will have been swung up to the position of Fig. 7 to take a label from the stack, and as a result of the vacuum formed on account of the label on the nozzle 6, the "micro-switch" 39 will have broken the circuit of the solenoid 9, so that the spring 11 will have retracted the gripper 5, 6 to the position of Figs. 8, 8A to present a label in the path of the nozzle 19a of the transfer conveyor. To load the rotary conveyor fully, it now requires to be indexed twice by the labelling device. This may be done either by manually tripping the bottle "micro-switches" 39, 39a or by allowing two bottles to feed past the machine. These two bottles will not be labelled. On being indexed the first time, the first arm 19a of the rotary conveyor passes between the suction blocks 6 of the feed gripper, picks the label off them as in Fig. 9 and carries it round to the gummer 29 where it is indexed as in Figs. 10, 10A.

At the same time, owing to the destroying of the vacuum in the feed gripper suction system, the feed gripper switch 12 is closed and the feed solenoid 9 causes the gripper arm 5 to swing upwards and draw off another label as in Fig. 10 as a result of which the vacuum is restored, the solenoid 9 de-energised, and the gripper arm 5 again dropped into the path of the second arm 19b of the transfer conveyor ready for the next transfer operation as in Fig. 11. On being indexed the second time the rotary conveyor carries the label on the arm 19a between the rollers on the gum box and, while the arms 30 are still spread apart, conveys it to the position in front of the suction blocks 30a on the labelling device as in Figs. 12, 12a the arms 30 having in the meantime closed together again. As the machine is indexed further the following arms 19b, 19c, 19d of the rotary conveyor repeat the above mentioned operations.

At the same time bottles are passing along the bottle conveyor 2 and as they approach the labelling position, trip the arm 40 and close the bottle "micro-switches" 39, 39a, so that the labelling solenoid 38 is energised by its condenser as above described and so the labelling carriage 31 is moved forward. The continued movement of the labelling carriage 31 causes its suction blocks 30a to pick off the label on the suction block 19a of the transfer conveyor and spread it about the bottle, the twin arms being opened out against the action of the spring 32 as they move over the bottle as in Figs. 13, 13A, the block 72 holding the bottle against the pressure of the labeller. The labelling carriage 31 is then withdrawn as in Fig. 14 which also shows the simultaneous turning of the transfer conveyor with the arm 19b moving into position between the arm 30, and the picking of another label by the arm 19c from the gripper nozzle 6 which at once begins to swing upwards as a result of its vacuum having been again destroyed and its solenoid energised. In this movement the carriage 31 is tripped by the abutment ball race 47 as described so that its arms 30 open out and pass a freshly presented label, the timing of the closing of the "micro-switch" for operating the transfer conveyor detent solenoid and that for controlling the turning of the labelling indexing disc being such that the new label passes between the arms 30 while they are still spread, as in Figs. 15, 15A which also shows the gripper nozzle swinging down again with another label for presentation to the arm 19d.

At this stage also, as shown in Fig. 15A the bottle trip arm 40 is being held by its solenoid 54 in the path of the oncoming bottles so that the bottle being labelled is isolated and not inerfered with, the solenoid 54 being energised sufficiently long enough to allow the labelled bottle to proceed on its way before releasing the oncoming bottles. As the carriage 31 approaches its innermost position the swivel plate projection 43c abuts against the ball race 48a so that the plate 43 is swung back into its normal position and the arms 30 caused to close towards one another. By this time the condensers controlling the solenoid 53 have fully discharged and the next oncoming bottle is able to trip the arm 40 for another labelling operation as in Figs. 16, 16A which also show the label on the arm 19b awaiting the next outward stroke of the carriage 31.

It will be seen that the operation of the machine depends entirely on the bottles as they are caused to pass through the labelling position opposite the machine, so that up to its maximum speed capacity the machine operates under the control of the bottles.

Referring to Figs. 17 and 18 which show semi-diagrammatically a simple feed form of the machine for dealing with hand fed bottles, a label stack holder 80 is mounted at the upper end of two vertical guide bars 81 which are secured to the machine base 82. Slidable on the guide bars 81 is a carrier member or block 83 on the one side of which is rotatably mounted a disc 84 having a central bore 84a communicating at its one end near its periphery with two transverse bores 84b leading to swivel joints 85 in which are mounted two right-angled hollow swivel feed gripper arms 86 terminating at their upper ends in suction blocks 87. The gripper arms 86 are connected near their lower ends by means of a light tension spring 88; and mounted near their upper ends on their inner faces are small rollers 89 which are adapted to roll round the bottle side to assist in the application of the gummed label. The block 83 is attached to a cord or wire 90 passing over pulleys 91, 92 and having suspended therefrom a counter weight 93 for maintaining the block 83 in the upper position.

Concentrically mounted about the central bore of the disc is a pinion 94 which is adapted to engage with a vertical rack 95 arranged parallel with the guide bars 81 and in the path of the pinion 94, of a length sufficient to turn the pinion through 180°. The pinion 94 has formed thereon a boss 94a having on opposite sides flats against which abut the flat faces of two oppositely arranged spring pressed blocks 96 (Fig. 17). This arrangement ensures that the feed gripper assembly is held correctly in either of the two positions it occupies.

The other end of the central bore 84a in the disc 84 communicates with a vertical tubular rod 97 whose lower end is secured in the axial bore of a piston 98 in a vacuum cylinder 99 whose lower end is connected by a pipe 100 to a vacuum source not shown.

On either side of the hollow rod 97 in front of but near the lower ends of the guides 81 is a gummer 101 having gumming rollers 102 projecting from its inner side. Vertically below the gummers is a V-block 103 for receiving the bottle to be labelled.

In operation, with the feed gripper blocks against the bottom of the stack of labels 80, a bottle 104 is placed on the V-block 103 and the vacuum supply turned on. A label is sucked on to the feed gripper 87, and as a result of the vacuum formed in cylinder 99 the feed gripper assembly is drawn down against the counter weight 93. As the block 83 moves down, the pinion engages the rack 95, and the feed gripper assembly is turned through 180° so that it is reversed and the label now points downwards, in which position it is held by the resilient blocks 96 and is passed between the gummer rollers 102 and has its edges gummed. Further downward movement causes the label to be applied to the bottle, the arms 86 opening as their rollers 89 contact the bottle 104 and spread the label thereon. As the gripper arms 86 leave the label the vacuum is destroyed and the counter-weight 93 restores the feed gripper assembly to the upper position, the rack 95 again engaging the pinion 94 as the assembly moves upwards, so that the gripper blocks 82 are once more presented to the bottom of the stack 80, and the above cycle of operations is repeated. Thereafter all the operator has to do is to remove the labelled bottle and place a fresh bottle in its place.

The feed gripper assembly may be mechanically reciprocated by means of a slipping clutch drive controlled by a detent which in its turn is controlled by a solenoid energised by a diaphragm switch which closes on the creation of a vacuum as a result of the picking of a label from the stack, so that the energised solenoid withdraws the detent, the label is brought down, turned over, and applied to the bottle as above described, and the gripper assembly returned to the upper position mechanically. Such a mechanism is similar to that above described with reference to the larger machine shown in Figs. 1 to 6. The detent virtually remains withdrawn while there is a vacuum supply source available and a stack of labels.

We claim:

1. An improved labelling machine for labelling articles such as bottles, tins, jars and packets, wherein the means for feeding the labels comprise a suction feed gripper adapted to be connected to a suction source, a suction operated actuating device for controlling the movement of said feed gripper, said actuating device being connected to said feed gripper so that when the vacuum is reduced or destroyed—owing to there being no label gripped by the feed gripper—the said feed gripper will move against the label stack to take up a label, and when the vacuum is restored or increased—when there is a label being gripped—the feed gripper will move the label away from the stack towards the labelling position.

2. A labelling machine according to claim 1 comprising a label affixing device, suction transfer means into the path of which feed gripper is adapted to move, said suction transfer means being adapted to take up by suction the label from said feed gripper, hold said label by suction, and move said label into the path of said label affixing device which is adapted to remove said label by suction from said transfer device and apply it to the bottle.

3. An improved labelling machine for labelling articles such as bottles, tins, jars and packets, wherein the means for feeding the labels comprise a suction feed gripper adapted to be connected to a suction source, a suction operated actuating device for controlling the movement of said feed gripper, said actuating device being connected to said feed gripper so that when the vacuum is reduced or destroyed—owing to there being no label gripped by the feed gripper—the said feed gripper will move against the label stack to take up a label, and when the vacuum is restored or increased—when there is a label being gripped—the feed gripper will move the label away from the stack towards the labelling position, a suction operated actuating device adapted to control the movement of the transfer means so that when they have taken a label off the feed gripper, the increased vacuum operates the said actuating device to arrest the transfer means when they arrive in line with the labelling position on the bottle.

4. A labelling machine according to claim 1 comprising a label affixing device, suction transfer means into the path of which feed gripper is adapted to move, said suction transfer means being adapted to take up by suction the label from said feed gripper, hold said label by suction, and move said label into the path of said label affixing device which is adapted to remove said label by suction from said transfer device and apply is to the bottle, while of the feed gripper and the transfer means, single suction block means are mounted on the one, and a pair of suction block means are mounted on the other, said single suction block means being adapted to pass between said pair of suction block means.

5. A labelling machine according to claim 1 comprising a label affixing device, suction transfer means into the path of which feed gripper is adapted to move, said suction transfer means being adapted to take up by suction the label from said feed gripper, hold said label by suction, and move said label into the path of said label affixing device which is adapted to remove said label by suction from said transfer device and apply it to the bottle said transfer means comprising an intermittently rotatable conveyor, a plurality of suction blocks on said conveyor, said suction blocks being adapted to come behind and to the side of the feed gripper suction block means and remove the label therefrom by suction and retain it in position by suction and means for automatically arresting said conveyor when the label arrives in line with the labelling position of the bottle.

6. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, and means for moving said arms towards the bottle with the arms on both sides of the bottle axis so that said arms ultimately contact the sides of the bottle and spread the label thereon.

7. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon and means for spreading the arms as they recede from the bottle so that they do not foul a following label.

8. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon, a gummer, and means whereby prior to the label's being transferred to the labelling affixing device its under face is brought into contact with a gummer.

9. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon, driving means, a labeller control indexing disc, a slipping clutch adapted to transmit the drive from said driving means to said disc a solenoid operated detent adapted to control the indexing of said disc, switch means controlled by the passage of a bottle for controlling said detent, and means whereby the label is presented in the path of the label affixing device so that as the suction arms move towards the bottle the label is between the arms and the bottle.

10. A labelling machine according to claim 1 comprising a label affixing device, suction transfer means into the path of which feed gripper is adapted to move, said suction transfer means being adapted to take up by suction the label from said feed gripper, hold said label by suction, and move said label into the path of said label affixing device which is adapted to remove said label by suction from said transfer device and apply it to the bottle said transfer means comprising an intermittently rotatable conveyor, a plurality of suction blocks on said conveyor, said suction blocks being adapted to come behind and to the side of the feed gripper suction block means and remove the label therefrom by suction and retain it in position by suction, means for automatically arresting said conveyor when the label arrives in line with the labelling position of the bottle, said means comprising a transfer index disc for driving said conveyor, driving means, a slipping clutch adapted to transmit the drive from said driving means to said transfer indexing disc, a solenoid operated detent adapted to effect indexing of said disc so that rotation of said disc is automatically arrested when the label is brought into line with the labelling position on the bottle a label affixing device, a label affixing indexing disc adapted to control said label affixing device, and a switch adapted to be actuated by said label affixing indexing disc as said disc turns past a predetermined point.

11. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon a reciprocating carriage consisting of two portions resiliently connected, the arms of the label affixing device being pivotally mounted on one of said portions carrying said arms being resiliently connected, an indexing disc, and a connecting rod connecting said disc to the other portion of the carriage.

12. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon and means for positively spreading the arms of the label affixing device.

13. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon means for positively spreading the arms of the labels affixing device, said means comprising a swivel plate having formed on each side of its swivel point cam faces against which the sides of the arms are adapted to press, a pawl-like abutment on the machine, a projection on the one side of said swivel plate adapted to abut against said abutment so that on the return movement of the carriage the swivel plate is turned and moves the arms apart, an abutment on the machine, and a second projection in said swivel plate, said projection having an inclined face adapted to abut against said abutment as the carriage returns to its inner position, so that the plate has an impact imparted to it which swivels it round to its original position in which it is held by the pressure of the arms, the first projection tripping the pawl-like abutment as it moves towards the labelling position.

14. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon means for positively spreading the arms of the label affixing device, said means comprising a swivel plate having formed on each side of its swivel point cam faces against which the sides of the arms are adapted to press, a pawl-like abutment on the machine, a projection on the one side of said swivel plate adapted to abut against said abutment so that on the return movement of the carriage the swivel plate is turned and moves the arms apart, an abutment on the machine, a second projection in said swivel plate, said projection having an inclined face adapted to abut against said abutment as the carriage returns to its inner position, so that the plate has an impact imparted to it which swivels it round to its original position in which it is held by the pressure of the arms, the first projection tripping the pawl-like abutment as it moves towards the labelling position two ball races mounted respectively on the labelling arms, the swivel plate being of segmental form and having formed in its sides two segmental recesses corresponding to and adapted to receive said bearings, so that when the plate is swivelled out of its normal position the ball races are forced out of their recesses and the arms are thus spread apart, the recess then after pressing against the segmental periphery of the swivel plate until the plate receives the impact when they once more engage their recesses and hold the plate positively against further swivelling.

15. A labelling machine according to claim 1 comprising a labelling affixing device and means whereby after the label has been brought into line with the labelling position of the bottle it is transferred to said label affixing device, said label affixing device comprising a pair of arms, resilient means between said arms, suction blocks on said arms for gripping the label, means for moving said arms towards the bottle with the arms on both sides of the bottle axis so that said arms ultimately contact the sides of the bottle and spread the label thereon a reciprocating carriage consisting of two portions resiliently connected, the arms of the label affixing device being pivotally mounted on one of said portions carrying said arms being resiliently connected, an indexing disc, a connecting rod connecting said disc to the other portion of the carriage and means for holding the bottle during the actual labelling comprising a suitably shaped block adapted to be moved laterally relatively to the path of the bottles, by the labelling carriage as it moves into the labelling position, and to press resiliently against the bottles.

16. An improved labelling machine for labelling articles such as bottles, tins, jars and packets, wherein the means for feeding the labels comprise a suction feed gripper adapted to be connected to a suction source, a suction operated actuating device for controlling the movement of said feed gripper, said actuating device being connected to said feed gripper so that when the vacuum is reduced or destroyed—owing to there being no label gripped by the feed gripper—the said feed gripper will move against the label stack to take up a label, and when the vacuum is restored or increased—when there is a label being gripped—the feed gripper will move the label away from the stack towards the labelling posi-tion, means for holding the bottle during the actual labelling comprising a suitably shaped block adapted to be moved laterally relatively to the path of the bottles, the labelling carriage as it moves into the labelling position, and to press resiliently against the bottles, and a resilient telescopic member, said block being operatively connected with said telescopic member against which the labelling carriage is adapted to abut so that as the carriage moves outwards into the actual labelling position the block moves inwards and presses against the bottle.

17. A labelling machine according to claim 1 comprising a carrier member adapted to move to and from the label stack, a feed gripper rotatably mounted on said member, and a tripping device arranged along the path of movement of the feed gripper between its upper and lower positions so that as the gripper moves away from and towards the stack it is turned through 180° and is then always in the correct position for receiving a label or depositing one on the article.

18. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a pinion rigidly mounted on the feed gripper, a rack arranged parallel with the direction of movement of the carrier member, said rack being adapted to be engaged by said pinion after the feed gripper has left the stack, and to be disengaged from said pinion before said feed gripper reaches the labelling position, and vice versa for the return movement of the feed gripper, and means for holding the feed gripper from turning in both positions.

19. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a pinion rigidly mounted on the feed gripper, a rack arranged parallel with the direction of movement of the carrier member, said rack being adapted to be engaged by said pinion after the feed gripper has left the stack, and to be disengaged from said pinion before said feed gripper reaches the labelling position, and vice versa for the return movement of the feed gripper, a hub on said pinion said hub having formed thereon flats, and resilient blocks having corresponding flats thereon for engagement with the flats on said hub, so that the feed gripper is held resiliently against turning in both positions.

20. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a pinion rigidly mounted on the feed gripper, a rack arranged parallel with the direction of movement of the carrier member, said rack being adapted to be engaged by said pinion after the feed gripper has left the stack, and to be disengaged from said pinion before said feed gripper reaches the labelling position, and vice versa for the return movement of the feed gripper, and means for holding the feed gripper from turning in both positions, vertical guide bar means supporting the label stack, the carrier means being slidable on said guide bar means, a disc rigidly mounted on the pinion, swivel joints on said disc, said disc having formed thereon a central bore communicating at its one end near its periphery with two transverse bores leading to said swivel joints, the feed gripper comprising two right angled hollow swivel feed gripper arms mounted in said swivel joints suction blocks at the end of said arms, and resilient means connecting said gripper arm to draw them together.

21. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a pinion rigidly mounted on the feed gripper a rack arranged parallel with the direction of movement of the carrier member, said rack being adapted to be engaged by said pinion after the feed gripper has left the stack, and to be disengaged from said pinion before said feed gripper reached the labelling position, and vice versa for the return movement of the feed gripper, and means for holding the feed gripper from turning in both positions, vertical guide bar means supporting the label stack, the carrier means being slidable on said guide bar means, a disc rigidly mounted on the pinion, swivel joints on said disc, said disc having formed thereon a central bore communicating at its one end near its periphery with two transverse bores leading to said swivel joints, the feed gripper comprising two right angled hollow swivel feed gripper arms mounted in said swivel joints suction blocks at the end of said arms, resilient means connecting said gripper arms to draw them together vertical tubular rod communicating with the other end of the central bore in the block, a vacuum cylinder a piston in said vacuum cylinder, said piston having an axial bore which receives the lower end of said tubular rod, and counterbalance means for maintaining the block normally in the upper position, the arrangement being such that when a label is gripped by the feed gripper, a vacuum is created in the cylinder and the piston, and with it the block is drawn down against said counterbalance means until the vacuum is discharged as a result of the removal of the label from the feed gripper.

22. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a pinion rigidly mounted on the feed gripper a rack arranged parallel with the direction of movement of the carrier member, said rack being adapted to be engaged by said pinion after the feed gripper has left the stack, and to be disengaged from said pinion before said feed gripper reaches the labelling position, and vice versa for the return movement of the feed gripper, and means for holding the feed gripper from turning in both positions, vertical guide bar means supporting the label stack, the carrier means being slidable on said guide bar means, a disc rigidly mounted on the pinion, swivel joints on said disc, said disc having formed thereon a central bore communicating at its one end near its periphery with two transverse bores leading to said swivel joints, the feed gripper comprising two right angled hollow swivel feed gripper arms mounted in said swivel joints suction blocks at the end of said arms, resilient means connecting said gripper arms to draw them together, and rollers mounted on the inside of the gripper arms near the suction blocks, said rollers being adapted to roll round the bottle sides to assist in the application of the gummed label.

23. A labelling machine according to claim 1 comprising a carrier member adapted to move to and from the label stack, a feed gripper rotatably mounted on said member, a tripping device arranged along the path of movement of the feed gripper between its upper and lower positions so that as the gripper moves away from and towards the stack it is turned through 180° and is then always in the correct position for receiving a label or depositing one on the article, a slipping clutch drive for reciprocating said carrier member, a detent adapted to control said slipping clutch drive detent, a solenoid for controlling said detent, a diaphragm switch adapted to energise said solenoid on the creation of a vacuum as a result of the picking of a label from the stack, so that the energised solenoid withdraws the detent, the label is brought down, turned over, and applied to the bottle, and means for returning the carrier means to the upper portion.

NORMAN F. ARMSTRONG.
JOHN A. TWEDDELL.

No references cited.